(12) United States Patent
Suhy, Jr. et al.

(10) Patent No.: US 7,062,446 B1
(45) Date of Patent: Jun. 13, 2006

(54) APPARATUS AND METHOD FOR TRACKING AND MANAGING PHYSICAL ASSETS

(75) Inventors: Andrew E. Suhy, Jr., Perrysburg, OH (US); Brent C. Parent, Holland, OH (US)

(73) Assignee: Dana Corporation, Toledo, OH (US)

( * ) Notice: Subject to any disclaimer, the term of this patent is extended or adjusted under 35 U.S.C. 154(b) by 547 days.

(21) Appl. No.: 09/441,289

(22) Filed: Nov. 16, 1999

(51) Int. Cl.
*G06F 15/46* (2006.01)
(52) U.S. Cl. .......................................... 705/1
(58) Field of Classification Search ................ 705/7, 705/8, 9, 10, 22, 23, 28, 29
See application file for complete search history.

(56) References Cited

U.S. PATENT DOCUMENTS

| | | | | |
|---|---|---|---|---|
| 4,404,639 A | * | 9/1983 | McGuire et al. | 701/35 |
| 5,682,142 A | | 10/1997 | Loosmore et al. | |
| 5,757,643 A | * | 5/1998 | Kuroda et al. | 364/138 |
| 5,842,212 A | * | 11/1998 | Ballurio et al. | 707/100 |
| 5,950,173 A | * | 9/1999 | Perkowski | 705/26 |
| 5,953,707 A | * | 9/1999 | Huang et al. | 705/10 |
| 5,959,577 A | * | 9/1999 | Fan et al. | 342/357.13 |
| 6,003,808 A | * | 12/1999 | Nguyen et al. | 244/1 R |
| 6,012,045 A | * | 1/2000 | Barzilai et al. | 705/37 |
| 6,112,206 A | * | 8/2000 | Morris et al. | 707/10 |
| 6,141,629 A | * | 10/2000 | Yamamoto et al. | 702/187 |
| 6,208,853 B1 | * | 3/2001 | LoVasco et al. | 455/414 |
| 6,347,302 B1 | | 2/2002 | Joao | |
| 6,502,080 B1 | | 12/2002 | Eichorst et al. | |

FOREIGN PATENT DOCUMENTS

| | | |
|---|---|---|
| GB | 2 308 947 A | 7/1997 |
| WO | WO 97/17683 | 5/1997 |

OTHER PUBLICATIONS

New lease on truck life: Automated maintenance, Beverage World v113n566 pp. 138; Deierlein, Bob; May 1994.*
Webster's Ninth New Collegiate Dictionary; Copyright 1994, p. 637.*

(Continued)

*Primary Examiner*—James P. Trammell
(74) *Attorney, Agent, or Firm*—Rader, Fishman & Grauer PLLC (57) ABSTRACT

A computer based system automatically gathers, analyzes, and delivers information relating to the procurement and utilization of a plurality of such assets, such as a fleet of industrial equipment, so as to maximize productivity and to reduce operating costs and administrative burdens. Each of the assets is preferably provided with a data acquisition device for sensing and storing one or more operating characteristics associated therewith. That information can be transmitted through space to a receiver connected to a local controller for storing such information and for transmitting such information over the internet to a remote analysis system. The remote analysis system automatically updates individual records associated with each of the assets with the information received from the internet. In response to such information, the remote analysis system automatically analyzes the newly provided information and generates reports regarding scheduled maintenance, warranty coverage, and other management information. These reports can be transmitted back over the internet to an administrative controller for review by one or more persons responsible for managerial review. Additionally or alternatively, the remote analysis system can automatically post such reports on a website and, thus, be made available to one or more of such persons upon request.

29 Claims, 5 Drawing Sheets

OTHER PUBLICATIONS wysiwyg://19http://www.businessweek.com/1998/35/z337 2007.htm; "The Great Equalizer", Business Week- Ira Sager, May 18, 1994.*

I.D. System, Inc.; Brochure including articles dated Oct. 1998, and May 31, 1998.

SXI Technologies; UDL Fleet Management System, Undated.

Remote Equipment Systems, Inc.; UDL Fleet Management System, undated.

* cited by examiner

APPARATUS AND METHOD FOR TRACKING AND MANAGING PHYSICAL ASSETS

BACKGROUND OF THE INVENTION

This invention relates in general to systems for tracking and managing physical assets to improve productivity. In particular, this invention relates to a computer based system for automatically gathering, analyzing, and delivering information relating to the procurement and utilization of a plurality of such assets, such as a fleet of industrial equipment, so as to maximize productivity and to reduce the operating costs and administrative burdens associated with such assets.

Many businesses operate a plurality of physical assets to assist in the performance of the daily activities that are required to produce goods or services. For example, a typical manufacturer of goods often uses a fleet of industrial equipment, such as forklifts, conveyors, machine tools, and the like, in its daily operations to facilitate the manufacture of goods for its customers. In a similar manner, a typical provider of services also often employs a plurality of assets, such as computers, communications equipment, photo imaging equipment, and the like, in its daily operations to facilitate the performance of services for its customers. Traditionally, businesses have purchased such assets for use in their facilities and have employed staff to operate and maintain the assets in furtherance of the manufacture of goods or the performance of services.

Regardless of the specific nature of the business, the operation of these assets has usually been considered to be somewhat ancillary to the core nature of the business. In other words, although the use of these assets is helpful (indeed, sometimes necessary) for the business to manufacture the goods or provide the services in a cost efficient manner, the ownership, operation, and maintenance of such assets is not, of itself, a core function of the business. Consequently, the costs associated with the procurement and utilization of such assets have not been traditionally monitored or analyzed by the business in great detail. Rather, such costs have usually been considered to be relatively fixed costs of doing business, and any management of such assets has been performed, if at all, by relatively low level employees having little training or inclination to increase productivity and reduce costs.

Obviously, many businesses have been able to produce goods and provide services without actively managing the costs of obtaining and operating these assets. However, optimization of productivity and minimization of costs are key considerations in the modern business environment. Thus, it would be desirable to provide a computer based system for automatically gathering, analyzing, and delivering information relating to the procurement and utilization of a plurality of such assets, such as a fleet of industrial equipment, so as to maximize productivity and to reduce operating costs and administrative burdens associated with such assets.

SUMMARY OF THE INVENTION

This invention relates to a computer based system for automatically gathering, analyzing, and delivering information relating to the procurement and utilization of a plurality of such assets, such as a fleet of industrial equipment, so as to maximize productivity and to reduce operating costs and administrative burdens. Each of the assets is preferably provided with a data acquisition device for sensing and storing one or more operating characteristics associated therewith. That information can be transmitted through space to a receiver connected to a local controller for storing such information and for transmitting such information over the internet to a remote analysis system. The remote analysis system automatically updates individual records associated with each of the assets with the information received from the internet. In response to such information, the remote analysis system automatically analyzes the newly provided information and generates reports regarding scheduled maintenance, warranty coverage, and other management information. These reports can be transmitted back over the internet to an administrative controller for review by one or more persons responsible for managerial review. Additionally or alternatively, the remote analysis system can automatically post such reports on a website and, thus, be made available to one or more of such persons upon request.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
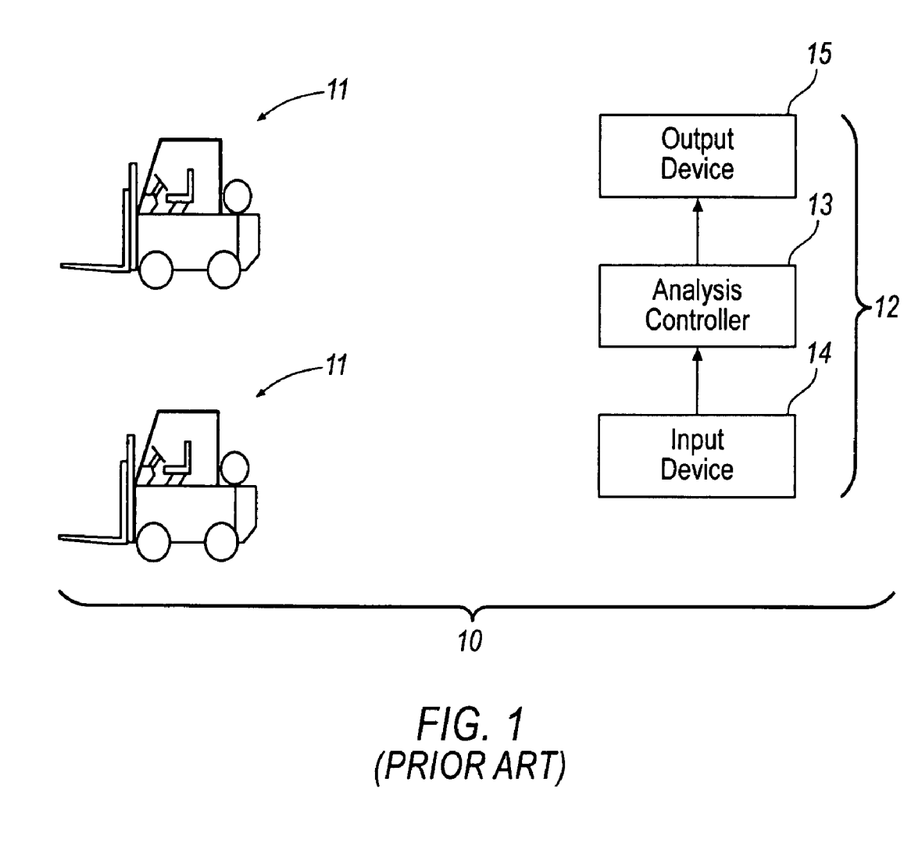
FIG. 1 is a schematic block diagram of a prior art computer based system for tracking and managing a plurality of assets.

Referring now to the drawings, there is illustrated in FIG. 1 a schematic block diagram of a prior art computer based system, indicated generally at 10, for tracking and managing a plurality of assets, several of which are indicated generally at 11. The assets 11 are illustrated as being a plurality of pieces of movable industrial equipment, such as a plurality of conventional forklifts or similar machinery, used in the manufacture of goods in a typical factory environment. However, the prior art method could be used to track and manage any type of asset 11, such as those described above, used in the manufacture of goods or the performance of services. The basic structure and operation of each of the forklifts 11 are well known in the art and, therefore, require no discussion for a complete understanding of this invention.

The prior art system 10 further included a remote analysis system, indicated generally at 12, for tracking and managing the assets 11. The remote analysis system 12 was completely separate and apart from the assets 11 and included an analysis controller 13 having one or more input devices 14 and one or more output devices 15 connected thereto. The remote analysis system 12 could be embodied as any conventional electronic controller, such as a microprocessor-based computer device. The input device 14 was embodied as a keyboard or other conventional mechanism for manually inputting data in electronic form to the analysis controller 13 for processing in the manner described below. The output device 15 was embodied as a printer or other conventional mechanism for generating a hard copy of the management information generated by the analysis controller 13 in the manner described below.

Figure 2:
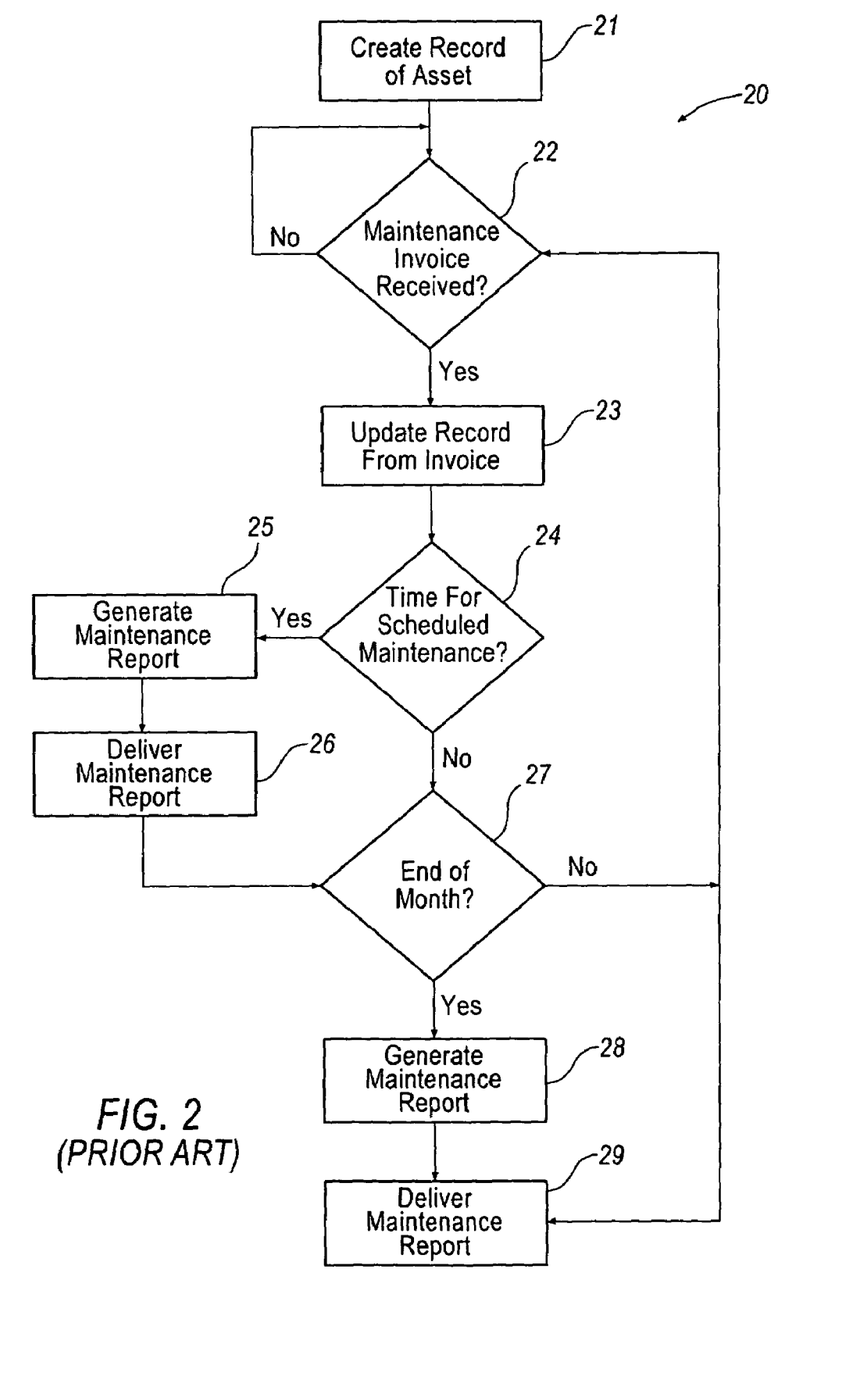
FIG. 2 is a flow chart of a prior art method for tracking and managing assets in accordance with the prior art computer based system illustrated in FIG. 1.

Referring now to FIG. 2, there is illustrated a flow chart, indicated generally at 20, of a prior art method for tracking and managing the assets 11 in accordance with the prior art computer based system 10 illustrated in FIG. 1. Throughout this discussion, reference will be made to a first person or entity that owns or operates the assets 11 that are being tracked and to a second person or entity that is responsible for tracking the management information relating to such assets 11. Notwithstanding this, it will be appreciated that a single person or entity may not only own and operate the assets 11, but also track the management information relating thereto.

In an initial step 21 of the prior art method 20, a record was created for each individual asset 11 by the person or entity responsible for tracking such assets, such as one of the forklifts 11 illustrated in FIG. 1. This record was created electronically within the analysis controller 13 by means of the input device 14 and included a variety of information that was desired to be tracked for management purposes. First, the record included information that uniquely identified the particular asset 11 being tracked. Such identification information included, for example, data regarding the make, model, year, and serial number of the asset 11, plus any customer-assigned identification number. Second, the record included information that related to the operational characteristics of the particular asset 11 being tracked, such as the physical requirements or limitations of the asset 11 (mast height, load capacity, type of tires for the forklift 11, for example), the type of fuel used, and the period of time or usage between the performance of periodic maintenance. Third, the record included information relating to the acquisition of the asset 11 by the owner or lessee thereof. Such acquisition information included, for example, the type and date of acquisition (purchase or lease, for example), the name of the owner or lessee, the location at which the asset 11 is used, the expected amount of usage of the asset 11 (one, two, or three shifts, for example), and the cost of the acquisition or lease. Furthermore, the record included an area for adding additional information or remarks as desired.

In a second step 22 of the prior art method 20, it was determined whether a maintenance invoice had been received by the person or entity responsible for tracking the assets 11. Typically, a maintenance invoice was a written communication that was generated created by or at the request of the person or entity that owned or operated the assets 11. The maintenance invoice was usually generated upon the occurrence of an event relating to the particular asset 11 and generally contained information regarding the status of one or more operational characteristics of that asset 11. For example, after a particular forklift 11 had been operated by the person or entity that owned or operated the asset 11 for a particular period of time, it would require the performance of some maintenance. This maintenance may, for example, have constituted routine preventative service as a result of the elapse of a predetermined period of time or usage. Alternatively, such maintenance may have constituted non-routine service, such as a repair of a mechanical breakdown. In either event, a maintenance invoice was generated as a result of the performance of that maintenance. The occurrence of other events related to the assets 11 could also result in the generation of maintenance invoices.

Regardless of the nature of the event that caused them to be generated, the maintenance invoices were generated in hard copy form and contained therein certain information that was desired to be tracked for management purposes, such as the date and nature of the maintenance that was performed, the amount of usage of the asset 11 as of the date of such maintenance, and the cost of such maintenance. To perform the second step 22 of the prior art method 20, the maintenance invoices were required to be physically delivered from the location where the assets 11 were being used or serviced to the location of the analysis controller 13 or to the location of the input device 14 of the analysis controller 13. By physically delivered, it is meant that the maintenance invoice was transmitted in a non-electronic, hard copy form (including, for example, by facsimile) from the person or entity that owned or operated the asset 11 (and who performed, or had performed, the maintenance on the asset 11) to the person or entity responsible for tracking the assets 11.

As shown in FIG. 2, the prior art method 20 continuously repeated step 22 until it was determined that a maintenance invoice had been received by the person or entity responsible for tracking the assets 11. When that occurred, the prior art method branched from the step 22 to a step 23, wherein the record contained in the analysis controller 13 relating to the particular asset 11 was updated with the information contained in the maintenance invoice. This step 23 was accomplished by utilizing the input device 14 to manually enter the information contained in the maintenance invoice into the record relating to the particular asset 11 contained in the analysis controller 13.

Based upon the updated information contained in the record of the asset 11, the analysis controller 13 was programmed to perform a fourth step 24 of the prior art method 20, wherein it was determined whether a sufficient period of time or usage had elapsed as to trigger the performance of periodic routine maintenance for that asset 11. Typically, such determination was made by determining the amount of the elapsed time or usage of the asset 11 (by comparing the most recent indication of the date or amount of usage of the asset 11 with the previous date or amount of usage contained in the record stored in the analysis controller 13), and by comparing such elapsed time or amount of usage with a predetermined standard (also contained in the record of the asset 11 stored in the analysis controller 13). If it was determined that a sufficient amount of elapsed time or amount of usage had occurred, the method 20 branched from the step 24 to a step 25, wherein a hard copy maintenance report was generated by the output device 15. Then, in step 26 of the prior art method 20, the maintenance report generated in the step 25 was physically delivered from the person or entity responsible for tracking the asset 11 to the person or entity that owned or operated the asset 11. The maintenance report advised the person or entity that owned or operated the asset 11 that the time had arrived for the performance of periodic routine maintenance.

Thereafter, the prior art method 20 entered a step 27, wherein it was determined whether a predetermined period of time had elapsed to generate a periodic management report covering some or all of the assets 11 being tracked. Alternatively, if in step 24 of the prior art method 20, it was determined that a sufficient amount elapsed time or amount of usage had not yet occurred, the method 20 branched directly from the step 24 to the step 27. In either event, such management reports were typically generated on a monthly basis. Thus, if the end of the month had occurred, the prior art method 20 branched from the step 27 to a step 28 wherein a hard copy management report was generated by the output device 15. Then, in step 29 of the prior art method 20, the management report generated in the step 28 was physically delivered from the person or entity responsible for tracking the asset 11 to the person or entity that owned or operated the asset 11 The management report advised the person or entity that owned or operated the asset 11 of the status of some or all of the assets 11 that were being tracked, allowing various management oversight and decisions to be made at that time. Thereafter, the prior art method 20 returned from the step 29 to the step 22, wherein it was determined whether a maintenance invoice had been created by or at the request of the person or entity that owns or operates the assets 11 and was physically delivered to the person or entity responsible for tracking the assets 11. Alternatively, if in step 27 of the prior art method 20, it was determined that a predetermined period of time had not yet elapsed to generate a periodic management report covering some or all of the assets 11 being tracked, then the method 20 returned directly from the step 27 to the step 22.

Figure 3:
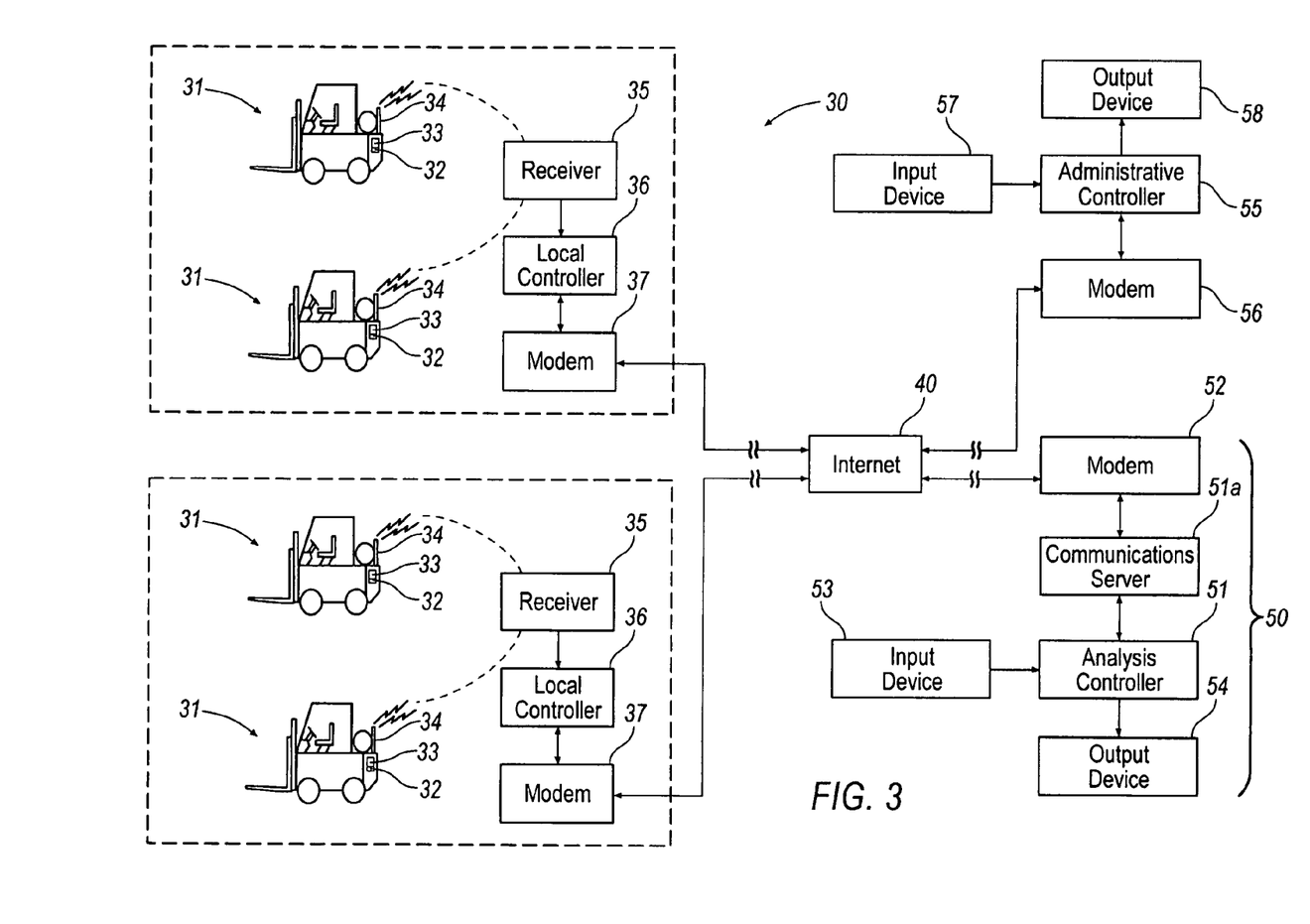
FIG. 3 is a schematic block diagram of a computer based system for tracking and managing a plurality of assets in accordance with this invention.

Referring now to FIG. 3, there is illustrated schematic block diagram of a computer based system, indicated generally at 30, for tracking and managing a plurality of assets, indicated generally at 31, in accordance with this invention. As with the prior art system 10 described above, the illustrated assets 31 are represented as a plurality of pieces of movable industrial equipment, such as a plurality of conventional forklifts or similar machinery, used in the manufacture of goods in a factory environment. However, the method of this invention can be used to track and manage any type of asset 31, such as those described above, used in the manufacture of goods or the performance of services.

As above, the basic structure and operation of each of the forklifts 31 are well known in the art, and, therefore, require no discussion for a complete understanding of this invention. However, unlike the forklifts 11 of the prior art system 10, a data acquisition device 32 is provided on each of the forklifts 31 for sensing and storing one or more operating characteristics of the associated forklift 31. The basic structure and operation of each of the data acquisition devices 32 are conventional in the art. For example, each of the data acquisition devices 31 may be embodied as an electronic processor or controller that can sense or be otherwise responsive to one or more operating conditions of the associated forklift 31. Each of the data acquisition devices 31 can be responsive to any desired operating conditions of the forklift 31 that might be considered important in making effective management decisions regarding the operation of the forklift 31. Such desired operating conditions can, for example, include the time duration of use (and non-use), distances traveled, and the like. The sensed operating conditions of the forklifts 31 are preferably stored at least temporarily in a memory of the data acquisition device 32 for subsequent communication to a remote analysis system, indicated generally at 50, for analysis in the manner described in detail below. Thus, the data acquisition devices 32 sense and store the desired operating conditions for each of the forklifts 31 during use.

Each of the forklifts 31 is further provided with a transmitter 33 or other communications system for transmitting the acquired data from the data acquisition device 32 to the remote analysis system 50 for analysis. Each of the transmitters 33 may be embodied as any conventional device for transmitting the acquired data to the remote analysis system 50, such as a hard-wired communications interface. However, as is well known, each of the forklifts 31 is a movable vehicle that is capable of traveling extensively throughout the particular environment in which it is used. To facilitate the transmission of the acquired data, therefore, the transmitter 33 is preferably embodied as a wireless communications system, such as represented by an antenna 34. The transmitters 33 and the wireless communications systems 34 can be embodied as conventional radio frequency transmitters provided on each of the forklifts 31 that transmit electromagnetic signals. However, other well known forms of wireless communication, such as those utilizing light or sound, may be used in lieu of a radio frequency transmitter.

The wireless communications systems 34 are adapted to transmit signals that are representative of the sensed operating conditions of the forklifts 31 through space to a receiver 35. In contrast to the forklifts 31 that can travel extensively throughout the environment in which they are operated, the receiver 35 is preferably provided at a fixed location within that environment. If desired, a plurality of such receivers 35 may be provided at different locations within the environment in which the forklifts 31 are operated. As the forklifts 31 move about the environment during use, they will occasionally pass by or near the receiver 35. When this occurs, the receiver 35 receives the data transmitted from the respective data acquisition units 32. The receiver 35 is also conventional in the art.

Preferably, the data acquisition units 32 and the receivers 35 are in bi-directional communication with one another. One advantage of such bi-directional communication is that the data acquisition unit 32 can send out a query signal on a predetermined basis to be received by the receiver 35 when the two units 32 and 35 are sufficiently close to communicate reliably with one another. Thus, when the data acquisition unit 32 contacts the receiver 35, the receiver 35 can send a first signal back to the data acquisition unit 32 to instruct it to begin transmitting the acquired data. At the completion of the data transfer, the receiver 35 can send a second signal back to the data acquisition unit 32 to acknowledge the receipt of the transmitted data. A conventional error checking algorithm can be used to confirm the accuracy and completeness of the transmitted data and, if necessary, request a re-transmission thereof.

Another advantage of such bi-directional communication is that data in the form of new commands, program updates, instructions, and the like can be sent to the data acquisition units 32 from the receiver 35. In some instances, such as when a data acquisition unit 32 is in generally continuous communication with a receiver 35, a user of the forklift 31 can be prompted to provide certain information for transmission to the receiver 35 for further analysis.

The receiver 35 is connected to a local controller 36. The local controller 36 is also, of itself, conventional in the art and may be embodied as an electronic controller that is adapted to receive and store at least temporarily the data from each of the receivers 35. Alternatively, if the assets 31 are fixed in position, such as in the case of a plurality of stationary machines used in a manufacturing environment, the receiver 35 or receivers 35 may be provided on movable structures that move about the environment to receive the information transmitted therefrom. In either event, it is desirable that the local controller 36 acknowledge receipt of the information transmitted from the data acquisition devices 32, allowing the data acquisition devices 32 to delete the transmitted information and begin storing newly acquired information. A combined system including the data acquisition device 32, the transmitter 33, the wireless communications system 34, the receiver 35, and software for operating the local controller 36 to gather and report data is commercially available, such as from I.D. Systems, Inc. of New York, N.Y.

Thus, after the forklifts 31 have been operated for a period of time, the local controller 36 will have gathered and stored therein a certain amount of information regarding the individual operating characteristics for each of the forklifts 31. The local controller 36 is programmed to periodically transmit the information stored therein to the remote analysis system 50 for analysis. This can be accomplished by providing the local controller 36 with a conventional modem 37 or other communications device that can convert the stored information into a format that is compatible for transmission through an electronic communications network, such as the internet 40. As is well known, the internet 40 is a digital electronic communications network that connects computer networks and organizational computer facilities around the world. Access to the internet 40 can be easily obtained in most locations through the local telephone lines or by similar means.

The system 30 of this invention may be used to track and manage a plurality of assets 31 located at any desired physical location. Additionally, the system 30 of this invention may be used to track and manage assets 31 located at a plurality of different physical locations, as suggested by the dotted lines in FIG. 3. Each different physical location can be provided with one or more receiver 35, a local controller 36, and a modem 37 to connect the system 30 to the internet 40.

As mentioned above, the sensed operating conditions of the forklifts 31 are intended to be transmitted to the remote analysis system 50 for analysis. Referring again to FIG. 3, it can be seen that the remote analysis system 50 includes an analysis controller 51 that is connected to communicate through the internet 40 by means of a modem 52 or similar communications device. If desired, a communications server 51a may be connected between the analysis controller 51 and the modem 52. The communications server 51a is provided to selectively receive and organize the information from each of the local controllers 36 for delivery to the analysis controller 51. The analysis controller 51 can be embodied as any conventional electronic controller that is capable of receiving the sensed operating conditions of the forklifts 31 and for processing that information in a desired manner described in detail below. Ideally, the sensed operating conditions of the forklifts 31 are used to automatically generate and analyze management reports relating to the procurement and utilization of a plurality of the forklifts 31 to maximize productivity and to reduce operating costs and administrative burdens. An input device 53 and an output device 54, both of which are conventional in the art, may be connected to the analysis controller 51.

As also shown in FIG. 3, one or more administrative controllers 55 (only one is illustrated) can be connected to the internet 50 through respective modems 56 or similar communications devices. Each of the administrative controllers 55 can also be embodied as any conventional electronic controller that can request and receive information from the remote analysis system 50 through the internet 40. In a manner that is described in detail below, the administrative controllers 55 are provided to request and receive the management information generated by the remote analysis system 50. If desired, the local controller 36 can also function as an administrative controller 55, although such is not necessary. An input device 57 and an output device 58, both of which are conventional in the art, may be connected to the administrative controller 55.

Figure 4A:
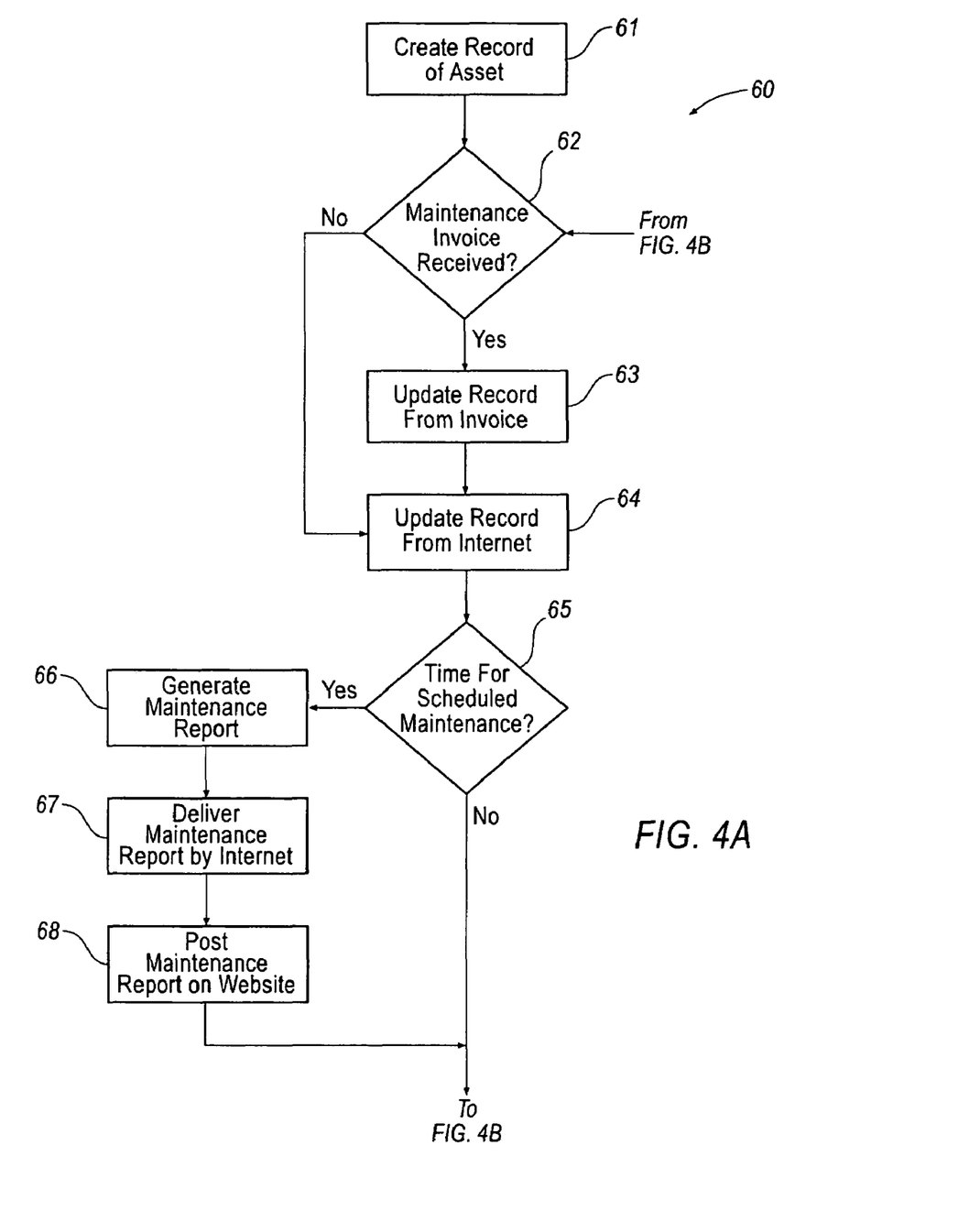
FIGS. 4A and 4B are first and second portions, respectively, of a flow chart of a method for tracking and managing assets in accordance with the computer based system illustrated in FIG. 3.
Figure 4B:
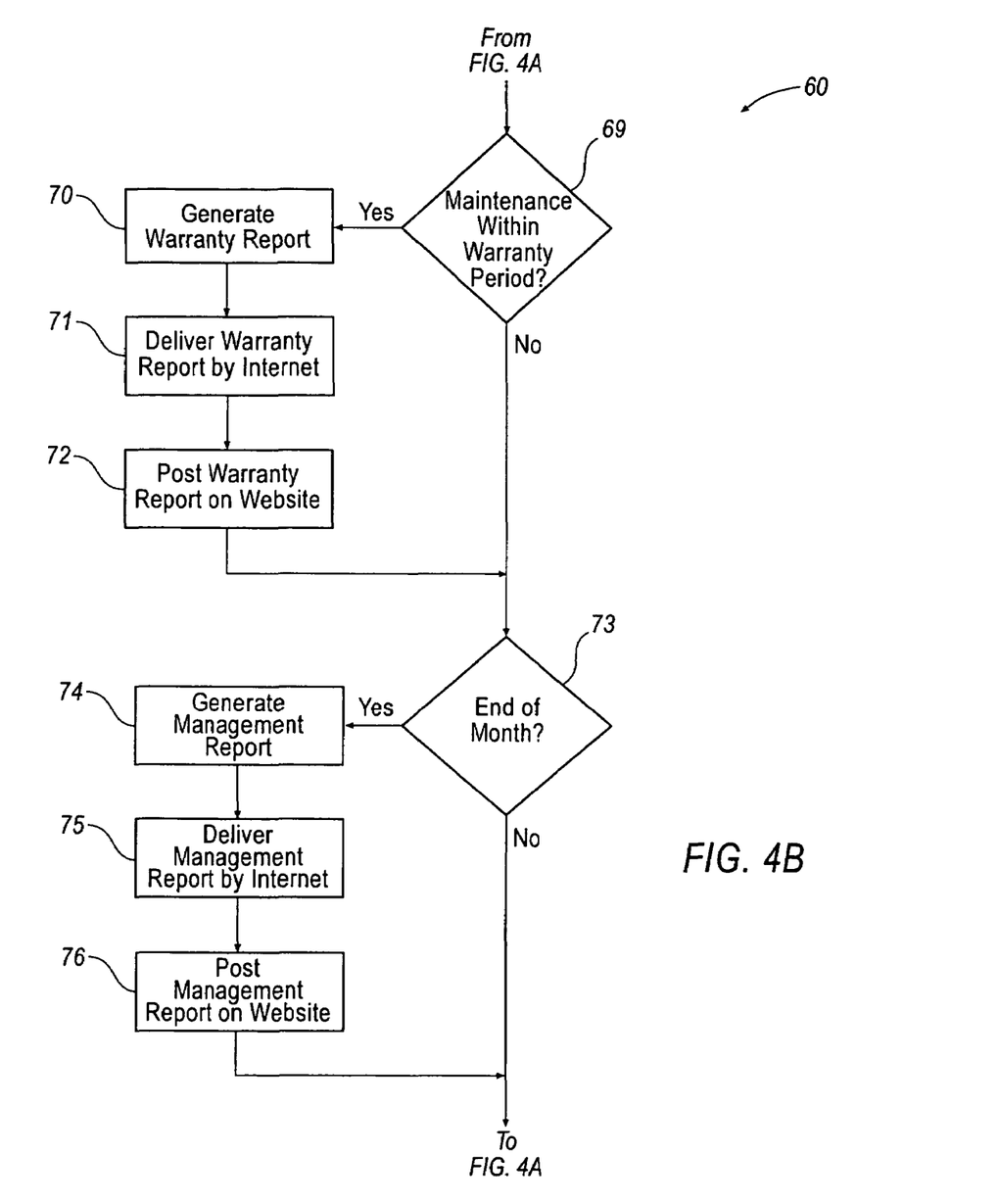

Referring now to FIGS. 4A and 4B, there is illustrated a flow chart, indicated generally at 60, of a method for tracking and managing the assets 31 in accordance with this invention using the computer based system 30 illustrated in FIG. 3. Throughout this discussion also, reference will be made to a first person or entity that owns or operates the assets 31 that are being tracked and to a second person or entity that is responsible for tracking information relating to such assets 31. As above, it will be appreciated that a single person or entity may not only own and operate the assets 31, but also track the information relating thereto.

In an initial step 61 of the method 60, a record is created for each individual asset 31 by the person or entity responsible for tracking such assets, such as one of the forklifts 31 illustrated in FIG. 3. The record can be created electronically within the analysis controller 51 by means of the input device 53 and can include a variety of information that is desired to be tracked for management purposes, including all of the information described above in connection with the forklifts 11 and the analysis controller 13. Additionally, the record can further include information regarding the nature and time duration of a warranty provided by the manufacturer or supplier of the assets 31. Such warranty information can be used in the manner described in further detail below to automatically determine whether the responsibility for the maintenance being performed on the asset 31, either in whole or in part, should rest with the manufacturer or the supplier of the asset 31 or with the owner or user of the asset 31.

In a second step 62 of the method 60, it is determined whether a maintenance invoice has been received by the person or entity responsible for tracking the assets 31. Such maintenance invoices can be generated and delivered in the same manner as described above. If it is determined that a maintenance invoice has been received by the person or entity responsible for tracking the assets 31, the method branches from the step 62 to a step 63, wherein the record contained in the analysis controller 51 relating to the particular asset 31 is updated with the information contained in the maintenance invoice in the same manner as described above. Next, the method enters a step 64 wherein the record contained in the analysis controller 51 relating to the particular asset 31 is updated with information from the internet 40. Alternatively, if it is determined that a maintenance invoice has not been received by the person or entity responsible for tracking the assets 31, the method branches directly from the step 62 to the step 64.

As discussed above, the local controller 36 will have gathered and stored therein a certain amount of information regarding the individual operating characteristics for each of the forklifts 31. The local controller 37 is programmed to periodically transmit the information stored therein to the remote analysis system 50 for analysis. The analysis controller 51 can include a memory circuit for storing this information from the local controller 36. The transmission of the information from the local controller 36 to the analysis controller 51 can be performed in real time, upon occurrence of predetermined events (such as the gathering of a predetermined amount is of information), or at predetermined time intervals. In any event, the record contained in the analysis controller 51 is automatically updated with the latest information regarding the status of the asset 31, without any human intervention.

Based upon the updated information contained in the record of the asset 31, the analysis controller 51 next determines whether a sufficient period of time or usage has elapsed as to trigger the performance of periodic routine maintenance for that asset 31. This determination can be made in the same manner as described above in connection with 24 of the prior art method 20. If it is determined that a sufficient amount elapsed time or amount of usage had occurred, the method 60 branches from the step 65 to a step 66, wherein an electronic maintenance report is generated. If desired, a hard copy of the maintenance report can also be generated by an output device 54 connected to the analysis controller 51. Then, in step 67 of the method 60, the electronic maintenance report generated in the step 66 is delivered from the person or entity responsible for tracking the asset 31 to the person or entity that owns or operates the asset 31 through the internet 40. As above, the maintenance report can advise the person or entity that owns or operates the asset 31 that the time had arrived for the performance of periodic routine maintenance. The electronic maintenance report can, for example, be delivered through the internet 40 to one or more of the administrative controllers 55 as desired. Alternatively, or additionally, the electronic maintenance report can be delivered through the internet 40 to one or more of the local controllers 36. Also, in step 68 of the method 60, the electronic maintenance report generated in the step 66 is posted on a website maintained on the internet 40. The website may be maintained either by the person or entity responsible for tracking the asset 31 or by the person or entity that owns or operates the asset 31 through the internet 40. As opposed to the direct electronic delivery of the maintenance report to a particular person or group of persons contemplated in the step 67, the step 68 contemplates that the maintenance report is made available to such person or group of persons at their request over the internet 40.

Thereafter, the method 60 enters a step 69, wherein it is determined whether any maintenance that has been performed on the asset 31 occurred within the warranty period provided by the manufacturer or supplier. Alternatively, if in the step 65 of the method 60, it was determined that a sufficient amount elapsed time or amount of usage had not yet occurred, the method 60 branches directly from the step 65 to the step 69. In either event, this determination can be made by comparing the date of service or amount of usage of the asset 31 with the warranty information contained in the record for that asset 31 contained in the analysis controller 51. If it is determined that service on the asset 31 occurred within the warranty period, the method 60 branches from the step 69 to a step 70, wherein an electronic warranty report is generated. If desired, a hard copy of the warranty report can also be generated by the output device 54 connected to the analysis controller 51. Then, in step 71 of the method 60, the electronic warranty report generated in the step 70 is delivered from the person or entity responsible for tracking the asset 31 to the person or entity that owns or operates the asset 31 through the internet 40. As above, the warranty report can advise the person or entity that owns or operates the asset 31 that the service performed on the asset 31 should be paid for by the manufacturer or supplier of the asset 31. The electronic warranty report can, for example, be delivered through the internet 40 to one or more of the administrative controllers 55 as desired. Alternatively, or additionally, the electronic warranty report can be delivered through the internet 40 to one or more of the local controllers 36. Also, in step 72 of the method 60, the electronic warranty report generated in the step 70 is posted on a website maintained on the internet 40. The website may be maintained either by the person or entity responsible for tracking the asset 31 or by the person or entity that owns or operates the asset 31 through the internet 40. As opposed to the direct electronic delivery of the warranty report to a particular person or group of persons contemplated in the step 71, the step 72 contemplates that the warranty report is made available to such person or group of persons at their request over the internet 40.

Thereafter, the method 60 enters a step 73, wherein it is determined whether a predetermined period of time has elapsed to generate a periodic management report covering some or all of the assets 31 being tracked. Alternatively, if in step 69 of the method 60, it was determined that a sufficient amount elapsed time or amount of usage had not yet occurred, the method 60 branches directly from the step 69 to the step 73. In either event, such management reports are typically generated on a monthly basis. Thus, if the end of the month has occurred, the method 60 branches from the step 73 to a step 74, wherein an electronic management report is generated. If desired, a hard copy of the management report can also be generated by the output device 54 connected to the analysis controller 51. Then, in step 75 of the method 60, the electronic management report generated in the step 74 is delivered from the person or entity responsible for tracking the asset 31 to the person or entity that owns or operates the asset 31 through the internet 40. As above, the management report can advise the person or entity that owns or operates the asset 31 of the same information as the management reports discussed above. The electronic management report can, for example, be delivered through the internet 40 to one or more of the administrative controllers 55 as desired. Alternatively, or additionally, the electronic management report can be delivered through the internet 40 to one or more of the local controllers 36. Also, in step 76 of the method 60, the electronic warranty report generated in the step 74 is posted on a website maintained on the internet 40. The website may be maintained either by the person or entity responsible for tracking the asset 31 or by the person or entity that owns or operates the asset 31 through the internet 40. As opposed to the direct electronic delivery of the management report to a particular person or group of persons contemplated in the step 75, the step 76 contemplates that the management report is made available to such person or group of persons at their request over the internet.

Thus, the computer based system 30 of this invention provides a superior method for tracking and managing the assets 31 than the prior art system 10. First, by providing the assets with the data acquisition devices 32 and the communications system 33 and 34, the operational characteristics and other information regarding the assets 31 is automatically sensed and transmitted to the analysis controller 51 on a real time basis, without requiring human intervention or assistance. Second, the analysis controller 51 is programmed to analyze such information as it is received and to automatically generate maintenance and warranty reports in response thereto. Third, all of the reports generated by the analysis controller 51 are automatically delivered to the appropriate persons through the internet 40, either directly to one or more of the administrative controllers 55 or by posting on a website. As a result, the computer based system 30 facilitates the gathering, analyzing, and delivering of information relating to the procurement and utilization of the assets 31 so as to maximize productivity and to reduce operating costs and administrative burdens.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for automatically gathering and analyzing data without human intervention relating to an asset comprising the steps of:
   (a) generating a maintenance invoice from an analysis controller when service is performed on the asset, wherein the maintenance invoice includes an indication of the amount of usage of the asset, wherein said indication of the amount of usage is captured by a data acquisition device, and wherein a receiver receives the indication of the amount of usage from the data acquisition device through a transmitter;
   (b) transmitting the maintenance invoice on a communications network from the analysis controller to an administrative controller;
   (c) comparing on the analysis controller, the indication of the amount of usage of the asset with a predetermined standard that is representative of the warranty period; and
   (d) generating a warranty report from said administrative controller without said human intervention if the amount of usage is less than the predetermined standard.

2. A system for gathering and analyzing data relative to an asset comprising;
   a data acquisition device for sensing at least one operating characteristic of the asset and for generating acquired data that is representative thereof;
   a transmitter attached to the asset for transmitting said acquired data from said data acquisition device;
   a receiver for receiving said acquired data transmitted from said transmitter;
   a local controller associated with said receiver that is in at least periodic communication with said transmitter;
   an analysis controller located at a second location remote from said local controller that is responsive to said acquired data from a plurality of local controllers for generating an analysis of said acquired data from said plurality of said local controllers, said analysis controller being configured for automatically determining without human intervention whether maintenance of the asset has been provided;
   a communications network connected between each of said local controllers and said analysis controller and permitting transmission of said acquired data from said local controller to said analysis controller;
   wherein said analysis controller provides for generating a maintenance invoice when service is performed on the asset;
   wherein said communications network provides for transmitting the maintenance invoice to an administrative controller; and
   wherein said analysis controller provides for comparing said acquired data with a predetermined standard.

3. The system defined in claim 2, wherein said transmitter includes a wireless communications system for transmitting said acquired data from said data acquisition device through space to said receiver.

4. The system defined in claim 2, further including an administrative controller separate from said analysis controller, wherein said analysis controller transmits said analysis of said data to said administrative controller.

5. The system defined in claim 4, wherein there are a plurality of administrative controllers.

6. The system defined in claim 4, wherein said analysis controller is configured to generate management reports relating to the procurement and utilization of the asset.

7. The system defined in claim 6, wherein said analysis controller is configured to post said reports to a website maintained on the internet.

8. The system defined in claim 2, wherein there is a warranty associated with the asset and there are a plurality of responsible parties associated with said system, said analysis controller configured to use at least a portion of said acquired data in automatically determining which of said responsible parties has responsibility in whole or in part for maintenance performed on the asset based on said warranty.

9. The system defined in claim 8, wherein a first responsible party comprises at least one of a manufacturer and a supplier of the asset and a second responsible party comprises at least one of an owner or user of the asset.

10. The system defined in claim 8, wherein said analysis controller includes a record of the asset, said record including said responsible parties and the nature of said responsibility, the nature of said responsibility including a factor based on said at least one operating characteristic of the asset.

11. The system defined in claim 10, wherein said factor comprises at least one of an amount of asset usage and date of service.

12. A system for gathering and analyzing data relative to an asset comprising:
   a data acquisition device for sensing at least one operating characteristic of the asset and for generating acquired data that is representative thereof;
   a transmitter attached to the asset for transmitting said acquired data from said data acquisition device;
   a receiver for receiving said acquired data transmitted from said transmitter;
   a local controller associated with said receiver that is in at least periodic communication with said transmitter;
   an analysis controller located at a second location remote from said local controller that is responsive to said acquired data from a plurality of local controllers for generating an analysis of said acquired data from said plurality of said local controllers, said analysis controller being configured for automatically determining without human intervention whether maintenance of the asset has been provided;
   a communications network connected between each of said local controllers and said analysis controller and permitting transmission of said acquired data from said local controller to said analysis controller;
   wherein there are a plurality of responsible parties associated with said system, a first responsible party comprising at least one of a manufacturer and a supplier of the asset and a second responsible party comprising at least one of an owner or user of the asset, said analysis controller configured to use at least a portion of said acquired data in automatically determining which of said responsible parties has responsibility in whole or in part for maintenance performed on the asset;
   said analysis controller including a record of the asset, said record including said responsible parties and the nature of said responsibility, the nature of said responsibility including a factor based on said at least one operating characteristic of the asset;
   wherein said analysis controller provides for generating a maintenance invoice when service is performed on the asset;
   wherein said communications network provides for transmitting the maintenance invoice to an administrative controller; and wherein said analysis controller provides for comparing said acquired data with a predetermined standard.

13. The system defined in claim 12, wherein there is a warranty associated with the asset, and the nature of said responsibility is based on said warranty.

14. The system defined in claim 12, wherein said at least one operating characteristic of the asset comprises an amount of asset usage, said amount of asset usage being used to automatically determine which of said responsible parties has said responsibility.

15. The system defined in claim 12, wherein said at least one operating characteristic of the asset comprises a date of service, said date of service being used to automatically determine which of said responsible parties has said responsibility.

16. The system defined in claim 12, further including an administrative controller separate from said analysis controller, wherein said analysis controller transmits said analysis of said data to said administrative controller.

17. The system defined in claim 16, wherein there are a plurality of administrative controllers, said analysis controller configured to generate management reports relating to the procurement and utilization of the asset.

18. The system defined in claim 17, wherein said analysis controller is configured to post said reports to a website maintained on the internet.

19. A system for gathering and analyzing data relating to an asset comprising:
a local controller located at a first location for acquiring data that is representative of at least one operating characteristic of the asset;
an analysis controller that is responsive to said acquired data from a plurality of local controllers for generating an analysis of said acquired data, said analysis controller being configured to determine whether maintenance of the asset has been provided;
a communications network connected between said local controller and said analysis controller and permitting transmission of said acquired data from said local controller to said analysis controller;
wherein there are a plurality of responsible parties associated with said system, said analysis controller configured to use at least a portion of said acquired data in automatically determining which of said responsible parties has responsibility in whole or in part for maintenance performed on the asset;
said analysis controller including a record of the asset, said record including said responsible parties and the nature of said responsibility, the nature of said responsibility including a factor based on said at least one operating characteristic of the asset;
wherein said analysis controller provides for generating a maintenance invoice when service is performed on the asset;
wherein said communications network provides for transmitting the maintenance invoice to an administrative controller; and
wherein said analysis controller provides for comparing said acquired data with a predetermined standard.

20. The system defined in claim 19, wherein there is a warranty associated with the asset, and the nature of said responsibility is based on said warranty.

21. The system defined in claim 20, wherein said at least one operating characteristic of the asset comprises at least one of an amount of asset usage and a date of service.

22. The system as defined in claim 21, said record including past acquired data, said current acquired data automatically compared with said past acquired data without human intervention using predetermined criteria to determine whether maintenance of the asset is required.

23. The system as defined in claim 22, wherein said predetermined criteria includes at least one of a period of time or asset usage.

24. The method defined in claim 1, wherein the entity performing service on the asset is not the owner.

25. The method defined in claim 1, wherein the entity performing service on the asset is not the operator of the asset.

26. The method as defined in claim 1, wherein the maintenance invoice is generated for a second entity on behalf of a first entity.

27. The method defined in claim 1, wherein the warranty report is generated for a second entity on behalf of a first entity.

28. The method defined in claim 1, further comprising the step of determining when service should be performed on the asset based on the amount of usage of the asset.

29. The method defined in claim 1, wherein service must be performed on an asset before the amount of usage of the asset is compared to the predetermined standard.

* * * * *